United States Patent
Kubo (10) Patent No.: US 9,664,402 B2
(45) Date of Patent: May 30, 2017

(54) AIR-CONDITIONING SYSTEM (71) Applicant: Kazuya Kubo, Tokyo (JP)

(72) Inventor: Kazuya Kubo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 496 days.

(21) Appl. No.: 14/375,893

(22) PCT Filed: Jan. 17, 2013

(86) PCT No.: PCT/JP2013/050709
§ 371 (c)(1),
(2) Date: Jul. 31, 2014

(87) PCT Pub. No.: WO2013/125263
PCT Pub. Date: Aug. 29, 2013

(65) Prior Publication Data
US 2015/0013958 A1    Jan. 15, 2015

(30) Foreign Application Priority Data

Feb. 23, 2012    (JP) .................. 2012-037405

(51) Int. Cl.
F24F 11/00    (2006.01)
F24D 15/04    (2006.01)
F24D 19/10    (2006.01)

(52) U.S. Cl.
CPC .......... *F24F 11/0012* (2013.01); *F24D 15/04* (2013.01); *F24D 19/1087* (2013.01);
(Continued)

(58) Field of Classification Search
CPC .......... F24F 11/0012; F24F 2011/0013; F24F 2011/0046; F24F 2011/0047;
(Continued)

(56) References Cited

U.S. PATENT DOCUMENTS 9,026,232 B2 * 5/2015 Fadell .................. F24F 11/0009
236/1 C
9,353,963 B2 * 5/2016 Kates ..................... F24F 11/006
(Continued)

FOREIGN PATENT DOCUMENTS

JP    02-178556 A    7/1990
JP    05-180501 A    7/1993
(Continued)

OTHER PUBLICATIONS

Extended European Search Report issued Jan. 5, 2016 in the corresponding EP application No. 13751929.4.
(Continued)

*Primary Examiner* — Ljiljana Ciric
(74) *Attorney, Agent, or Firm* — Posz Law Group, PLC (57) ABSTRACT

A controller (2a) sets a target setting temperature for an air-conditioning space 10, compares a value obtained by subtracting an outdoor temperature detected by an outdoor temperature sensor 9 from the target setting temperature, with a first threshold related to the value, compares a value obtained by subtracting the outdoor temperature from an indoor temperature detected by an indoor temperature sensor 8, with a second threshold related to the value, compares a value obtained by subtracting a heat load in the air-conditioning space 10 from a cooling capacity, with a third threshold related to the value, and controls operation of a heat pump type air-conditioning device 2 and a ventilating device 3 on the basis of these comparison results. The first threshold, the second threshold, and the third threshold are set in accordance with the number of people detected by a human detection sensor 5.

7 Claims, 4 Drawing Sheets (52) U.S. Cl.
CPC ...... *F24F 11/0034* (2013.01); *F24F 11/0076* (2013.01); *F24F 11/0079* (2013.01); *F24F 2011/0013* (2013.01); *F24F 2011/0046* (2013.01); *F24F 2011/0047* (2013.01); *F24F 2011/0063* (2013.01); *Y02B 30/746* (2013.01)

(58) Field of Classification Search
CPC ........... F24F 2011/0063; F24F 11/0034; F24F 11/0079; F24D 15/04; F24D 19/1087; Y02B 30/746
See application file for complete search history.

(56) References Cited

U.S. PATENT DOCUMENTS

| | | | | |
|---|---|---|---|---|
| 2012/0072032 | A1* | 3/2012 | Powell | F24F 11/0034 700/278 |
| 2012/0091804 | A1* | 4/2012 | Altonen | E06B 9/68 307/31 |
| 2013/0173064 | A1* | 7/2013 | Fadell | G05D 23/1902 700/276 |
| 2013/0184880 | A1* | 7/2013 | McMahon | G05B 15/02 700/286 |
| 2014/0277761 | A1* | 9/2014 | Matsuoka | F24F 11/006 700/276 |
| 2014/0277769 | A1* | 9/2014 | Matsuoka | G06Q 50/06 700/278 |
| 2014/0316584 | A1* | 10/2014 | Matsuoka | G05D 23/1917 700/278 |
| 2015/0051741 | A1* | 2/2015 | Bruck | G05D 23/1902 700/276 |
| 2015/0300892 | A1* | 10/2015 | Malhotra | G01K 13/00 700/276 |
| 2016/0123618 | A1* | 5/2016 | Hester | F24F 11/006 700/276 |
| 2016/0123619 | A1* | 5/2016 | Hester | F24F 11/006 700/276 |
| 2016/0201933 | A1* | 7/2016 | Hester | F24F 11/006 700/276 |
| 2016/0201934 | A1* | 7/2016 | Hester | F24F 11/006 700/276 |
| 2016/0377306 | A1* | 12/2016 | Drees | F24F 11/006 700/295 |

FOREIGN PATENT DOCUMENTS

| | | |
|---|---|---|
| JP | 08-061752 A | 3/1996 |
| JP | 2006-071214 A | 3/2006 |
| JP | 2006-329584 A | 12/2006 |
| JP | 2006-349276 A | 12/2006 |
| JP | 2010-181078 A | 8/2010 |
| JP | 2010-196957 A | 9/2010 |
| JP | 2011-220639 A | 11/2011 |

OTHER PUBLICATIONS

Office Action dated Jan. 19, 2015 issued in corresponding CN patent application No. 201310056057.9 (and English translation).
International Search Report of the International Searching Authority mailed Apr. 16, 2013 for the corresponding international application No. PCT/JP2013/050709 (and English translation).

* cited by examiner

AIR-CONDITIONING SYSTEM

CROSS REFERENCE TO RELATED APPLICATION

This application is a U.S. national stage application of International Application No. PCT/JP2013/050709 filed on Jan. 17, 2013 and is based on Japanese Patent Application No. 2012-037405 filed on Feb. 23, 2012, the disclosures of which are incorporated by reference.

TECHNICAL FIELD

The present invention relates to an air-conditioning system.

BACKGROUND ART

As an existing controller of an air-conditioning device, there is the following controller. For example, there is a controller which determines whether a room temperature is higher than a set value, and which performs control such that output from a microcomputer of an indoor unit to a driving transistor (the indoor unit side) becomes "LO" when the room temperature is lower than the set value, thereby stopping operation of a compressor and a ventilation fan (turning off the compressor and turning off the ventilation fan). On the other hand, when the room temperature is higher than the set value, the controller performs control such that an ON signal is transmitted from the microcomputer of the indoor unit to a microcomputer of an outdoor unit and output from the microcomputer of the outdoor unit to a driving transistor (the outdoor unit side) becomes "HI", whereby the controller starts operation of the compressor (turns on the compressor) and determines whether the outdoor temperature is lower than the room temperature. Here, when the outdoor temperature is higher than the room temperature, the controller stops operation of the ventilation fan (turns off the ventilation fan). On the other hand, when the outdoor temperature is lower than the room temperature, the controller starts operation of the ventilation fan (turns on the ventilation fan) (e.g., see Patent Literature 1).

In addition, as an existing controller of an air-conditioning device, there is a controller which manages presence/absence of a user in a living room, which operates an air-conditioning device and a heat exchanger when there is a person present in the room, and which stops the air-conditioning device and the heat exchanger when there is no person present in the room (e.g., see Patent Literature 2).

CITATION LIST

Patent Literature

Patent Literature 1: Japanese Unexamined Patent Application Publication No. 2-178556 (page 3, FIG. 4)
Patent Literature 2: Japanese Unexamined Patent Application Publication No. 2010-181078 ([0042] to [0047], FIG. 4)

SUMMARY OF INVENTION

Technical Problem

In an existing air-conditioning device having an auxiliary cooling operation by introduction of outdoor air as in Patent Literature 1 and 2, whether to introduce outdoor air is determined on the basis of the difference between the outdoor temperature and the indoor temperature or the difference between the outdoor temperature and an indoor setting temperature. However, loss caused by heat generation of a motor when the outdoor air is introduced, heat generation of a control board, or the like is not taken into consideration. Thus, there is a problem that even when the outdoor air is introduced into a room, cooling is not actually performed.

The present invention has been made in order to solve the above-described problem, and an object of the present invention is to provide an air-conditioning system which is able to effectively use cooling energy of outdoor air without deteriorating comfort.

Solution to Problem

An air-conditioning system according to the present invention includes: a heat pump type air-conditioning device; a human detection sensor; an indoor temperature sensor; an outdoor temperature sensor; a ventilating device circulating air in a room and outdoor air; and a controller controlling the heat pump type air-conditioning device and the ventilating device on the basis of detection values of the human detection sensor, the indoor temperature sensor, and the outdoor temperature sensor. The controller sets a target setting temperature for the room. The controller compares a value obtained by subtracting an outdoor temperature detected by the outdoor temperature sensor from the target setting temperature, with a first threshold related to the value. The controller compares a value obtained by subtracting the outdoor temperature from an indoor temperature detected by the indoor temperature sensor, with a second threshold related to the value. The controller compares a value obtained by subtracting an indoor heat load from a cooling capacity, with a third threshold related to the value. The controller controls operation of the heat pump type air-conditioning device and the ventilating device on the basis of these comparison results. The first threshold, the second threshold, and the third threshold are set in accordance with the number of people detected by the human detection sensor.

Advantageous Effects of Invention

The air-conditioning system according to the present invention is configured to change the thresholds for determining whether cooling by introduction of outdoor air is enabled, on the basis of person presence information by the human detection sensor, and thus has an effect of contributing to energy saving without deteriorating comfort. In addition, the air-conditioning system according to the present invention is configured to determine whether a cooling capacity by introducing the outdoor air is sufficient for the indoor heat load, on the basis of whether it exceeds the threshold or is equal to or lower than the threshold, and thus has an effect that outdoor air cooling that takes into consideration loss in introducing the outdoor air is enabled.

DESCRIPTION OF EMBODIMENTS

Embodiment 1

Embodiment 1 will be described with reference to FIGS. 1 and 2 below.

Figure 1:
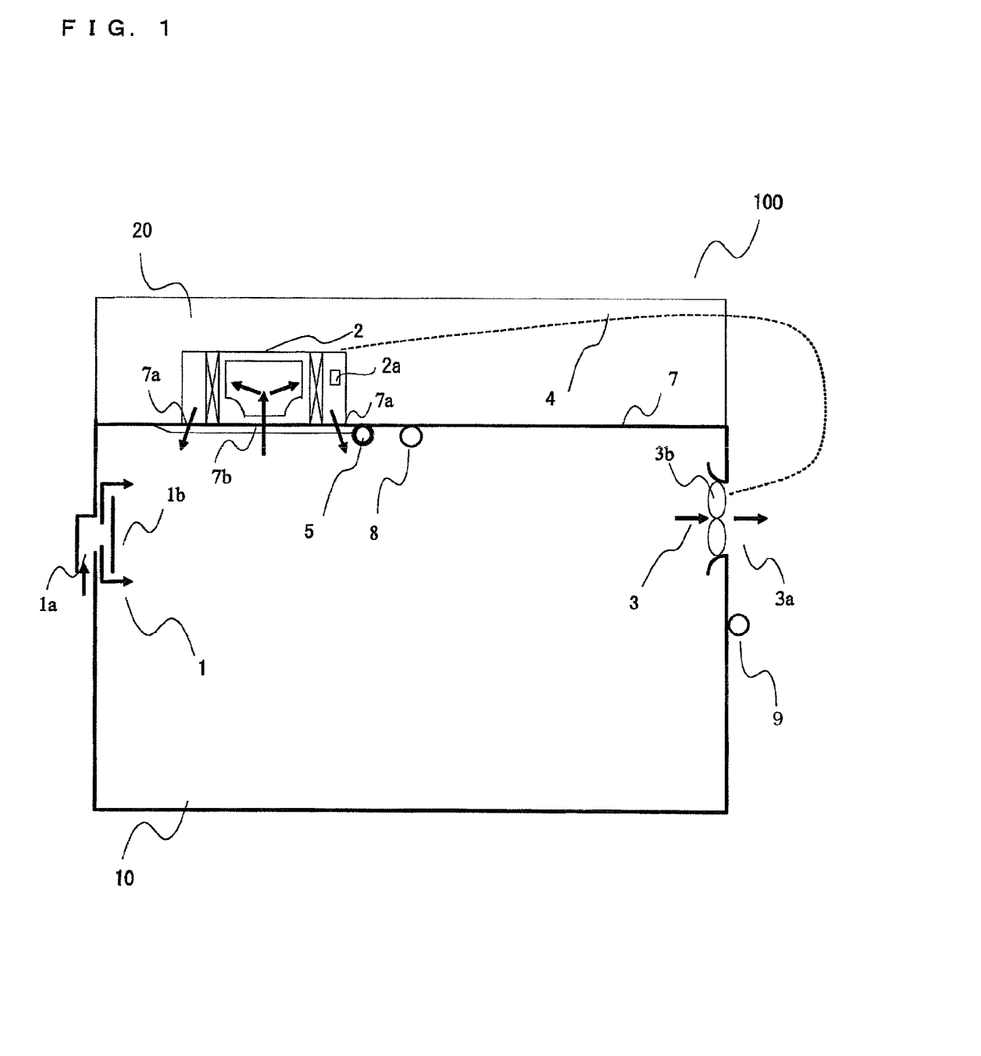
FIG. 1 is a diagram showing the configuration of an air-conditioning system according to Embodiment 1 of the present invention.

FIG. 1 is a diagram showing the configuration of an air-conditioning system 100 according to Embodiment 1 of the present invention.

Figure 2:
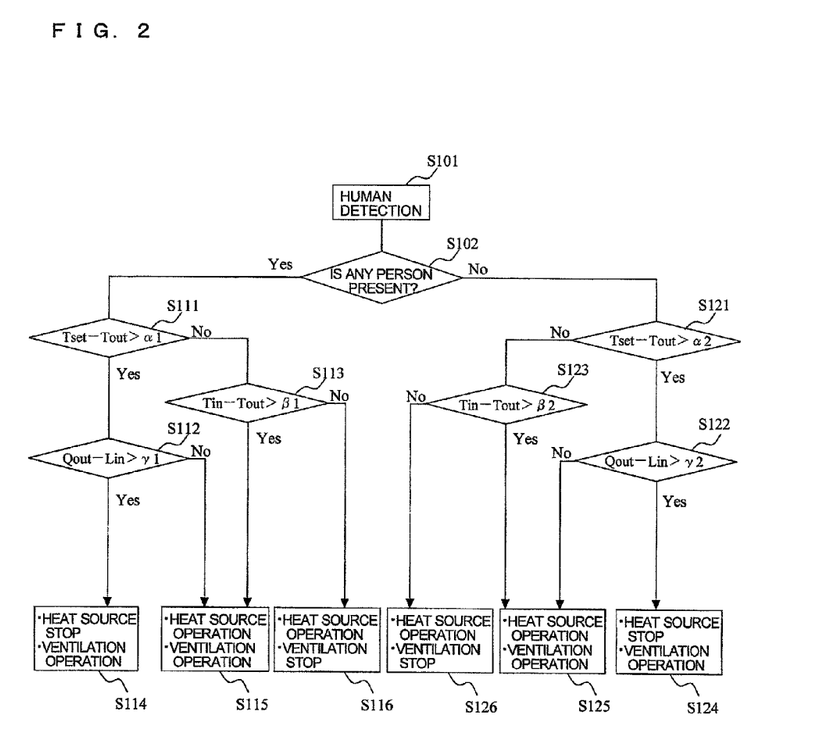
FIG. 2 is a diagram showing a flowchart of a control operation of the air-conditioning system according to Embodiment 1 of the present invention.

FIG. 2 is a diagram showing a flowchart of a control operation of the air-conditioning system 100 according to Embodiment 1 of the present invention.

In Embodiment 1, as shown in FIG. 1, the air-conditioning system 100 includes an outdoor air introduction portion 1, a heat pump type air-conditioning device 2, a ventilating device 3, a communication line 4, a human detection sensor 5, an indoor temperature sensor 8, and an outdoor temperature sensor 9.

The outdoor air introduction portion 1, the ventilating device 3, the human detection sensor 5, the indoor temperature sensor 8, and the outdoor temperature sensor 9 are provided in an air-conditioning space 10. The air-conditioning space 10 is surrounded by wall surfaces, and an opening 1a and an opening 3a are provided in some of the wall surfaces. The heat pump type air-conditioning device 2 is provided in an air-conditioning device installation space 20. The air-conditioning device installation space 20 is located above the air-conditioning space 10. The air-conditioning space 10 and the air-conditioning device installation space 20 are separated by, for example, a partition plate 7. The partition plate 7 is provided with an opening 7a through which cold air is introduced from the heat pump type air-conditioning device 2 to the air-conditioning space 10; and an opening 7b through which air in the air-conditioning space 10 is introduced to the heat pump type air-conditioning device 2.

The outdoor air introduction portion 1 serves to cause outdoor air to flow into the air-conditioning space 10. In the outdoor air introduction portion 1, the opening 1a is provided in an outer wall of the air-conditioning space 10, and an outdoor air separation plate 1b which separates the outdoor air, having flowed into the air-conditioning space 10, into two directions is provided at the opening inner side. The ventilating device 3 is a device which discharges air in the air-conditioning space 10 to the outside. In the ventilating device 3, the opening 3a is formed at a position facing the outdoor air introduction portion 1, and the ventilating device 3 includes a fan 3b. The human detection sensor 5 detects the number of people present in the air-conditioning space 10. The indoor temperature sensor 8 detects the temperature in the air-conditioning space 10. The outdoor temperature sensor 9 detects an outdoor temperature.

The heat pump type air-conditioning device 2 includes a controller 2a. The controller 2a controls operation of the heat pump type air-conditioning device 2 and the ventilating device 3 on the basis of thresholds (later-described), the indoor temperature, the outdoor temperature, a target setting temperature, a cooling capacity to cool the inside of a room, and an indoor heat load.

The heat pump type air-conditioning device 2 and the ventilating device 3 are connected to each other via the communication line 4 or wirelessly. Specifically, two-way communication between the heat pump type air-conditioning device 2 and the ventilating device 3 or one-way communication from the heat pump type air-conditioning device 2 to the ventilating device 3 is performed.

An operation in Embodiment 1 will be described with reference to FIG. 2 below.

First, the controller 2a causes the human detection sensor 5 to detect the number of people in the air-conditioning space 10 (step S101) and determines whether any person is present in the air-conditioning space 10, on the basis of a detected signal (step S102).

In the case of Yes in step S102 (in the case where any person is present in the air-conditioning space 10), the controller 2a sets the thresholds to $\alpha 1$ (corresponding to a first threshold in the present invention), $\beta 1$ (corresponding to a second threshold in the present invention), and $\gamma 1$ (corresponding to a third threshold in the present invention). In the case of No in step S102 (in the case where no person is present in the air-conditioning space 10), the controller 2a sets the thresholds to $\alpha 2$ (corresponding to the first threshold in the present invention), $\beta 2$ (corresponding to the second threshold in the present invention), and $\gamma 2$ (corresponding to the third threshold in the present invention).

Here, the thresholds $\alpha 1$ and $\alpha 2$ are values related to a difference obtained by subtracting an outdoor temperature Tout from a target setting temperature Tset. In addition, the thresholds $\beta 1$ and $\beta 2$ are values related to a difference obtained by subtracting the outdoor temperature Tout from an indoor temperature Tin. Moreover, the thresholds $\gamma 1$ and $\gamma 2$ are values related to a difference obtained by subtracting an indoor heat load Lin from a cooling capacity Qout by introduction of outdoor air. As described above, setting of the thresholds $\alpha 1$, $\alpha 2$, $\beta 1$, $\beta 2$, $\gamma 1$, and $\gamma 2$ is determined by a value detected by the human detection sensor 5 (by whether any person is present in the air-conditioning space 10). Here, the thresholds $\alpha 1$, $\beta 1$, and $\gamma 1$ in the case where any person is present are set so as to be higher than the thresholds $\alpha 2$, $\beta 2$, and $\gamma 2$ in the case where no person is present. This is because it is necessary to perform determination in consideration of the body temperature of a person.

In the case of Yes in step S102, the controller 2a calculates to determine whether Tset−Tout is higher than $\alpha 1$ (step S111).

In the case of Yes in step S111 (Tset−Tout>$\alpha 1$), the controller 2a calculates to determine whether Qout−Lin is higher than $\gamma 1$ (step S112).

In the case of No in step S111 (Tset−Tout≤$\alpha 1$), the controller 2a calculates to determine whether Tin−Tout is higher than $\beta 1$ (step S113).

In the case of Yes in step S112 (Qout−Lin>$\gamma 1$), the controller 2a stops the heat pump type air-conditioning device 2 and outputs an operation signal to the ventilating device 3, and the ventilating device 3 performs a ventilation operation upon reception of the operation signal (step S114).

In the case of No in step S112 (Qout−Lin≤$\gamma 1$), the controller 2a operates the heat pump type air-conditioning device 2 and also outputs an operation signal to the ventilating device 3, and the ventilating device 3 performs a ventilation operation upon reception of the operation signal (step S115).

In the case of Yes in step S113 (Tin−Tout>$\beta 1$), the controller 2a operates the heat pump type air-conditioning device 2 and also outputs an operation signal to the ventilating device 3, and the ventilating device 3 performs a ventilation operation upon reception of the operation signal (step S115).

In the case of No in step S113 (Tin−Tout≤β1), the controller 2a operates the heat pump type air-conditioning device 2 and outputs a stop signal to the ventilating device 3 (step S116).

In the case of No in step S102, the controller 2a sets the thresholds to α2, β2, and γ2. It should be noted that a subsequent operation (steps S121 to S126) is the same operation as an operation (steps S111 to S116) after the thresholds are set to α1, β1, and γ1, and thus the description thereof is omitted here.

As described above, the air-conditioning system 100 according to Embodiment 1 is configured to change the thresholds for determining whether cooling by introduction of outdoor air is enabled, on the basis of person presence information by the human detection sensor 5, and thus has an effect of contributing to energy saving without deteriorating comfort.

In addition, the air-conditioning system 100 according to Embodiment 1 is configured to determine whether the cooling capacity by introducing the outdoor air is sufficient for the indoor heat load, on the basis of whether it exceeds the threshold or is equal to or less than the threshold, and thus the air-conditioning system 100 has an effect of enabling outdoor air cooling which takes into consideration loss in introducing the outdoor air.

Moreover, the air-conditioning system 100 according to Embodiment 1 changes the thresholds on the basis of presence/absence of a person in the air-conditioning space 10. Thus, in the case where any person is present in the air-conditioning space 10, energy-saving operation which takes comfort into consideration is enabled. On the other hand, in the case where no person is present in the air-conditioning space 10, operation that prioritizes energy conservation over comfort is enabled.

It should be noted that in Embodiment 1, the controller 2a is provided in the heat pump type air-conditioning device 2, but the configuration is not limited to this. For example, the controller 2a may be provided independently of the heat pump type air-conditioning device 2. In this case, the controller 2a may detect a detection value of the human detection sensor 5, and the heat pump type air-conditioning device 2 and the ventilating device 3 may communicate with each other via the communication line 4 or wirelessly.

In addition, in Embodiment 1, when any person is present in the air-conditioning space 10, the thresholds are set to α1, β1, and γ1 regardless of the number of people, but the setting is not limited to this. For example, the thresholds may be increased in a stepwise fashion as the number of people present in the air-conditioning space 10 increases.

Moreover, in Embodiment 1, the outdoor air introduction portion 1 and the ventilating device 3 are provided independently of each other, but the configuration is not limited to this. For example, the outdoor air introduction portion 1 and the ventilating device 3 may be integrated with each other. In other words, only a single opening may be provided which serves as an opening through which the outdoor air is introduced and as an opening through which the air in the air-conditioning space 10 is discharged to the outside.

Embodiment 2

Embodiment 2 will be described with reference to FIGS. 3 and 4 below.

Figure 3:
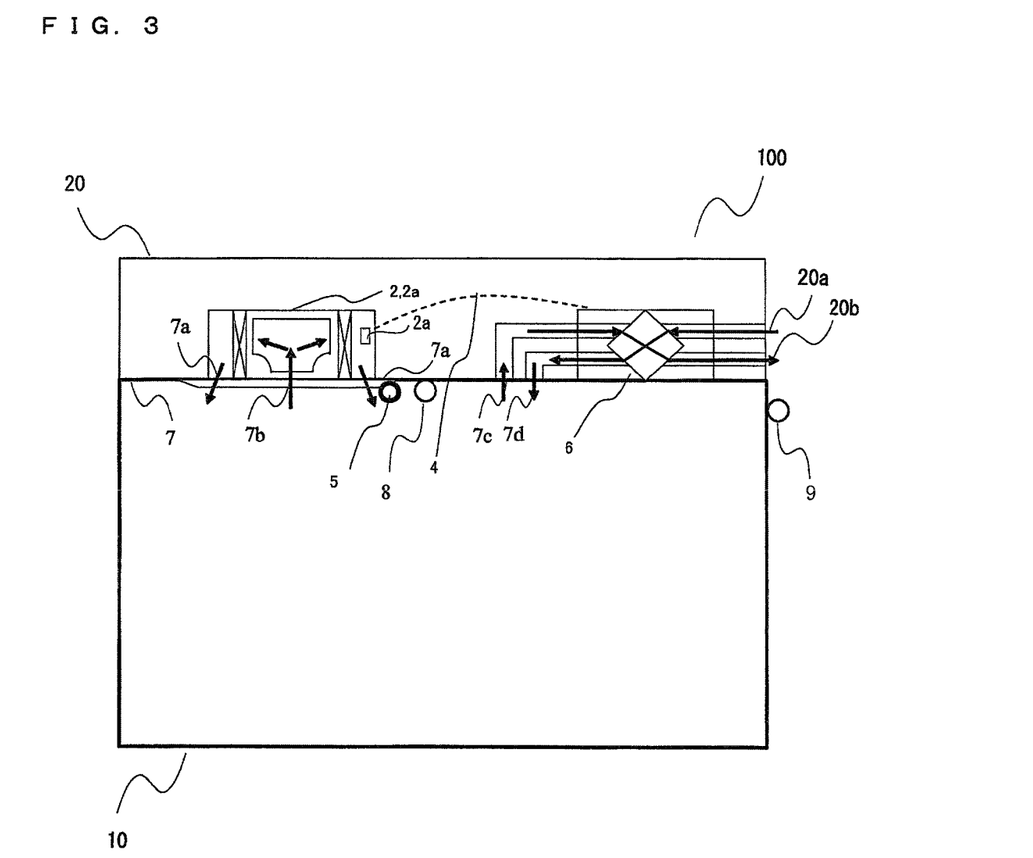
FIG. 3 is a diagram showing the configuration of an air-conditioning system according to Embodiment 2 of the present invention.

FIG. 3 is a diagram showing the configuration of an air-conditioning system 100 according to Embodiment 2 of the present invention.

Figure 4:
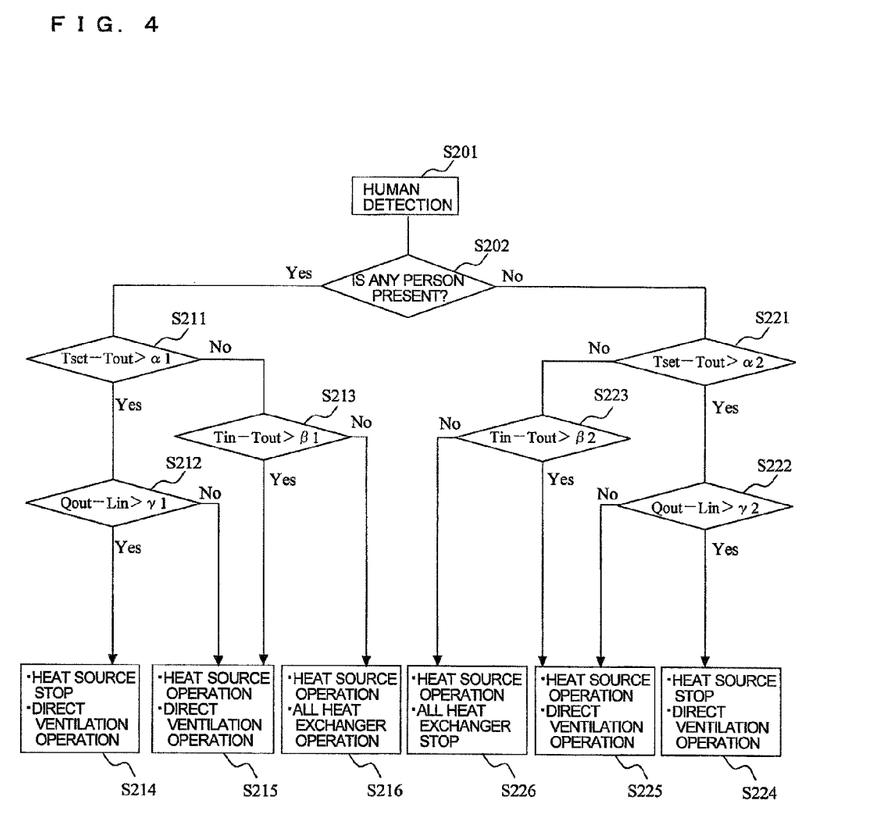
FIG. 4 is a diagram showing a flowchart of a control operation of the air-conditioning system according to Embodiment 2 of the present invention.

FIG. 4 is a diagram showing a flowchart of a control operation of the air-conditioning system 100 according to Embodiment 2 of the present invention.

It should be noted that the same portions as those of Embodiment 1 are designated by the same reference signs and the description thereof is omitted.

In Embodiment 1, the outdoor air introduction portion 1 through which the outdoor air flows into the air-conditioning space 10 is provided, and the ventilating device 3 which causes the air in the air-conditioning space 10 to flow out to the outside is provided, whereby the air in the air-conditioning space 10 and the outdoor air are circulated. In contrast, in Embodiment 2, the outdoor air introduction portion 1 and the ventilating device 3 are eliminated, a total heat exchanger 6 and openings 7c, 7d, 20a, and 20b (described later) are provided, and the heat pump type air-conditioning device 2 and the total heat exchanger 6 are caused to cooperate. Specifically, the heat pump type air-conditioning device 2 and the total heat exchanger 6 are connected to each other via the communication line 4 or wirelessly. More specifically, two-way communication between the heat pump type air-conditioning device 2 and the total heat exchanger 6 or one-way communication from the heat pump type air-conditioning device 2 to the total heat exchanger 6 is performed.

The total heat exchanger 6 is capable of direct ventilation in which the outdoor air is directly guided into the room without heat exchange in the total heat exchanger, and is provided in the air-conditioning device installation space 20. In the partition plate 7, the opening 7c through which the air in the air-conditioning space 10 flows into the air-conditioning device installation space 20 and further into the total heat exchanger 6 and the opening 7c through which air discharged from the total heat exchanger 6 flows into the air-conditioning space 10, are provided. In the air-conditioning device installation space 20, the opening 20a through which the outdoor air flows into the air-conditioning device installation space 20 and the opening 20b through which the air discharged from the total heat exchanger 6 flows out to the outside, are provided.

The total heat exchanger 6 exchanges heat between the air that flows through the opening 20a into the air-conditioning device installation space 20 and further into the total heat exchanger 6 and the air that flows through the opening 7c into the air-conditioning device installation space 20 and further into the total heat exchanger 6. The air that flows through the opening 20a into the air-conditioning device installation space 20 and further into the total heat exchanger 6 is discharged through the opening 7d to the air-conditioning space 10. The air that flows through the opening 7c into the air-conditioning device installation space 20 and further into the total heat exchanger 6 is discharged through the opening 20b to the outside. It should be noted that the total heat exchanger 6 and the opening 7c, the total heat exchanger 6 and the opening 7d, the total heat exchanger 6 and the opening 20a, and the total heat exchanger 6 and the opening 20b are connected to each other via ducts which are air passages.

An operation in Embodiment 2 will be described with reference to FIG. 4 below.

First, control of the heat pump type air-conditioning device 2 and the ventilating device 3 in the case where thresholds are set to α1, β1, and γ1 will be described with reference to FIG. 4 (steps S211 to S216).

First, the controller 2a causes the human detection sensor 5 to detect the number of people in the air-conditioning space 10 (step S201) and determines whether any person is present in the air-conditioning space 10, on the basis of a detected signal (step S202).

In the case of Yes in step S202, the controller 2a calculates to determine whether Tset−Tout is higher than α1 (step S211).

In the case of Yes in step S211 (Tset−Tout>α1), the controller 2a calculates to determine whether Qout−Lin is higher than γ1 (step S212).

In the case of No in step S211 (Tset−Tout≤α1), the controller 2a calculates to determine whether Tin−Tout is higher than β1 (step S213).

In the case of Yes in step S212 (Qout−Lin>γ1), the controller 2a stops the heat pump type air-conditioning device 2 and outputs a direct ventilation operation signal to the total heat exchanger 6, and the total heat exchanger 6 performs a direct ventilation operation upon reception of the direct ventilation operation signal (step S214).

In the case of No in step S212 (Qout−Lin≤γ1), the controller 2a operates the heat pump type air-conditioning device 2 and also outputs a direct ventilation operation signal to the total heat exchanger 6, and the total heat exchanger 6 performs a direct ventilation operation upon reception of the direct ventilation operation signal (step S215).

In the case of Yes in step S213 (Tin−Tout>β1), since there is a cooling effect by introducing the outdoor air into the room, the controller 2a operates the heat pump type air-conditioning device 2 and outputs a direct ventilation operation signal to the total heat exchanger 6 (step S215).

In the case of No in step S213 (Tin−Tout≤β1), the controller 2a operates the heat pump type air-conditioning device 2 and outputs a heat exchange ventilation operation signal to the total heat exchanger 6 (step S216).

In the case of No in step S202, the controller 2a sets the thresholds to α2, β2, and γ2. Then, the controller 2a calculates to determine whether Tset−Tout is higher than α2 (step S221).

In the case of Yes in step S221 (Tset−Tout>α2), the controller 2a calculates to determine whether Qout−Lin is higher than γ2 (step S222).

In the case of No in step S221 (Tset−Tout≤α2), the controller 2a calculates to determine whether Tin−Tout is higher than β2 (step S223).

In the case of Yes in step S222 (Qout−Lin>γ2), the controller 2a stops the heat pump type air-conditioning device 2 and outputs a direct ventilation operation signal to the total heat exchanger 6, and the total heat exchanger 6 performs a direct ventilation operation upon reception of the direct ventilation operation signal (step S224).

In the case of No in step S222 (Qout−Lin≤γ2), the controller 2a operates the heat pump type air-conditioning device 2 and also outputs a direct ventilation operation signal to the total heat exchanger 6, and the total heat exchanger 6 performs a direct ventilation operation upon reception of the direct ventilation operation signal (step S225).

In the case of Yes in step S223 (Tin−Tout>β2), since there is a cooling effect by introducing the outdoor air into the room, the controller 2a operates the heat pump type air-conditioning device 2 and outputs a direct ventilation operation signal to the total heat exchanger 6 (step S225).

In the case of No in step S223 (Tin−Tout≤β2), the controller 2a operates the heat pump type air-conditioning device 2 and outputs a stop signal to the total heat exchanger 6 (step S226). This is because when there is no person, it is considered that the amount of generated $CO_2$ is low and ventilation is not necessary.

As described above, the air-conditioning system 100 according to Embodiment 2 determines whether there is a cooling effect by introducing the outdoor air into the room, by comparing the target setting temperature, the outdoor temperature, and the indoor temperature. When there is a cooling effect, the air-conditioning system 100 causes the total heat exchanger 6 to perform a direct ventilation operation to introduce the outdoor air, and thus is able to contribute to energy saving.

In addition, the air-conditioning system 100 according to Embodiment 2 determines whether the cooling capacity by introduction of outdoor air is sufficient for the indoor heat load, on the basis of the thresholds. Thus, it is possible to evaluate the cooling capacity by the outdoor air that takes into consideration loss when introducing the outdoor air, and energy-saving operation is enabled without deteriorating comfort.

In addition, the air-conditioning system 100 according to Embodiment 2 changes the thresholds on the basis of presence/absence of a person in the air-conditioning space 10. Thus, when any person is present in the air-conditioning space 10, energy-saving operation that takes comfort into consideration is enabled. On the other hand, when no person is present in the air-conditioning space 10, operation that prioritizes energy saving over comfort is enabled.

In addition, in the air-conditioning system 100 according to Embodiment 2, when no person is present in the air-conditioning space 10, a stop signal is outputted from the heat pump type air-conditioning device 2 to the total heat exchanger 6. Thus, it is possible to provide the air-conditioning system 100 which is capable of energy-saving operation.

In addition, the air-conditioning system 100 according to Embodiment 2 is configured to use the total heat exchanger 6 as ventilation means. In other words, since ventilation means capable of heat exchange ventilation is used, comfort in the air-conditioning space 10 is not deteriorated when performing ventilation.

It should be noted that it is possible to install the indoor temperature sensor 8 and the outdoor temperature sensor 9 at various locations as long as it is possible to detect the indoor and outdoor temperatures. For example, the indoor temperature sensor 8 may be installed at a ceiling surface defining the air-conditioning space 10, and the outdoor temperature sensor 9 may be installed in the air-conditioning space 10 or outside the air-conditioning space 10.

REFERENCE SIGNS LIST 1 outdoor air introduction portion 1a opening 1b outdoor air separation plate 2 heat pump type air-conditioning device 2a controller 3 ventilating device 3a opening 3b fan 4 communication line 5 human detection sensor 6 total heat exchanger 7 partition plate 7a, 7b, 7c, 7d opening 8 indoor temperature sensor 9 outdoor temperature sensor 10 air-conditioning space 20 air-conditioning device installation space 20a, 20b opening 100 air-conditioning system

The invention claimed is:
1. An air-conditioning system comprising:
a heat pump type air-conditioning device;
a human detection sensor;
an indoor temperature sensor;
an outdoor temperature sensor;

a ventilating device circulating air in a room and outdoor air; and a controller controlling the heat pump type air-conditioning device and the ventilating device on the basis of detection values of the human detection sensor, the indoor temperature sensor, and the outdoor temperature sensor, wherein the controller sets a target setting temperature for the room, the controller compares a value obtained by subtracting an outdoor temperature detected by the outdoor temperature sensor from the target setting temperature, with a first threshold related to the value, the controller compares a value obtained by subtracting the outdoor temperature from an indoor temperature detected by the indoor temperature sensor, with a second threshold related to the value, the controller compares a value obtained by subtracting an indoor heat load from a cooling capacity, with a third threshold related to the value, the controller controls operation of the heat pump type air-conditioning device and the ventilating device on the basis of these comparison results, and the first threshold, the second threshold, and the third threshold are set in accordance with a number of people detected by the human detection sensor.

2. The air-conditioning system of claim 1, wherein when the number of people is detected by the human detection sensor:

when the value obtained by subtracting the outdoor temperature from the target setting temperature is equal to or lower than the first threshold, the controller compares the value obtained by subtracting the outdoor temperature from the indoor temperature, with the second threshold; when the value obtained by subtracting the outdoor temperature from the indoor temperature is equal to or lower than the second threshold, the controller operates the heat pump type air-conditioning device and stops operation of the ventilating device; and when the value obtained by subtracting the outdoor temperature from the indoor temperature is higher than the second threshold, the controller operates the heat pump type air-conditioning device and the ventilating device; and when the value obtained by subtracting the outdoor temperature from the target setting temperature is higher than the first threshold, the controller compares the value obtained by subtracting the indoor heat load from the cooling capacity, with the third threshold; when the value obtained by subtracting the indoor heat load from the cooling capacity is equal to or lower than the third threshold, the controller operates the heat pump type air-conditioning device and the ventilating device; and when the value obtained by subtracting the indoor heat load from the cooling capacity is higher than the third threshold, the controller stops operation of the heat pump type air-conditioning device and operates the ventilating device.

3. The air-conditioning system of claim 2, wherein the first threshold, the second threshold, and the third threshold are set so as to be increased as the number of people in the room increases.

4. The air-conditioning system of claim 1, wherein when the number of people is not detected by the human detection sensor:

when the value obtained by subtracting the outdoor temperature from the target setting temperature is equal to or lower than the first threshold, the controller compares the value obtained by subtracting the outdoor temperature from the indoor temperature, with the second threshold; when the value obtained by subtracting the outdoor temperature from the indoor temperature is equal to or lower than the second threshold, the controller operates the heat pump type air-conditioning device and stops operation of the ventilating device; and when the value obtained by subtracting the outdoor temperature from the indoor temperature is higher than the second threshold, the controller operates the heat pump type air-conditioning device and the ventilating device; and when the value obtained by subtracting the outdoor temperature from the target setting temperature is higher than the first threshold, the controller compares the value obtained by subtracting the indoor heat load from the cooling capacity, with the third threshold; when the value obtained by subtracting the indoor heat load from the cooling capacity is equal to or lower than the third threshold, the controller operates the heat pump type air-conditioning device and the ventilating device; and when the value obtained by subtracting the indoor heat load from the cooling capacity is higher than the third threshold, the controller stops operation of the heat pump type air-conditioning device and operates the ventilating device.

5. The air-conditioning system of claim 1, wherein the ventilating device includes a total heat exchanger capable of performing a direct ventilation operation in which the outdoor air is guided into the room without performing indoor heat exchange, and when the number of people is detected by the human detection sensor:

when the value obtained by subtracting the outdoor temperature from the target setting temperature is equal to or lower than the first threshold, the controller compares the value obtained by subtracting the outdoor temperature from the indoor temperature, with the second threshold; when the value obtained by subtracting the outdoor temperature from the indoor temperature is equal to or lower than the second threshold, the controller operates the heat pump type air-conditioning device and the total heat exchanger; and when the value obtained by subtracting the outdoor temperature from the indoor temperature is higher than the second threshold, the controller operates the heat pump type air-conditioning device and causes the direct ventilation operation to be performed; and when the value obtained by subtracting the outdoor temperature from the target setting temperature is higher than the first threshold, the controller compares the value obtained by subtracting the indoor heat load from the cooling capacity, with the third threshold; when the value obtained by subtracting the indoor heat load from the cooling capacity is equal to or lower than the third threshold, the controller operates the heat pump type air-conditioning device and causes the direct ventilation operation to be performed; and when the value obtained by subtracting the indoor heat load from the cooling capacity is higher than the third threshold, the controller stops operation of the heat pump type air-conditioning device and causes the direct ventilation operation to be performed.

6. The air-conditioning system of claim 5, wherein the first threshold, the second threshold, and the third threshold are set so as to be increased as the number of people in the room increases.

7. The air-conditioning system of claim 1, wherein
the ventilating device includes a total heat exchanger capable of performing a direct ventilation operation in which the outdoor air is guided into the room without performing indoor heat exchange, and
when the number of people is not detected by the human detection sensor:
when the value obtained by subtracting the outdoor temperature from the target setting temperature is equal to or lower than the first threshold, the controller compares the value obtained by subtracting the outdoor temperature from the indoor temperature, with the second threshold; when the value obtained by subtracting the outdoor temperature from the indoor temperature is equal to or lower than the second threshold, the controller operates the heat pump type air-conditioning device and stops operation of the total heat exchanger; and when the value obtained by subtracting the outdoor temperature from the indoor temperature is higher than the second threshold, the controller operates the heat pump type air-conditioning device and causes the direct ventilation operation to be performed, and
when the value obtained by subtracting the outdoor temperature from the target setting temperature is higher than the first threshold, the controller compares the value obtained by subtracting the indoor heat load from the cooling capacity, with the third threshold; when the value obtained by subtracting the indoor heat load from the cooling capacity is equal to or lower than the third threshold, the controller operates the heat pump type air-conditioning device and causes the direct ventilation operation to be performed; and when the value obtained by subtracting the indoor heat load from the cooling capacity is higher than the third threshold, the controller stops operation of the heat pump type air-conditioning device and causes the direct ventilation operation to be performed.

* * * * *